June 8, 1954 W. G. NEILD Re. 23,836

CARBON PILE REGULATOR

Original Filed Sept. 21, 1951

INVENTOR.
WILLIAM G. NEILD
BY James M. Kikels
ATTORNEY

Reissued June 8, 1954

Re. 23,836

UNITED STATES PATENT OFFICE 23,836

CARBON PILE REGULATOR

William G. Neild, Fair Haven, N. J., assignor to Bendix Aviation Corporation, Eatontown, N. J., a corporation of Delaware Original No. 2,655,581, dated October 13, 1953, Serial No. 247,683, September 21, 1951. Application for reissue March 1, 1954, Serial No. 413,492

4 Claims. (Cl. 201—51)

Matter enclosed in heavy brackets [ ] appears in the original patent but forms no part of this reissue specification; matter printed in italics indicates the additions made by reissue.

The present invention relates to carbon pile regulators and more particularly to a contact plug for use in a carbon pile regulator.

In carbon pile regulators, it is often necessary to replace the carbon pile and the contact plugs. Replacement of the carbon pile and contact plug on the fixed or pile screw end of the regulator is comparatively simple by merely removing the pile adjusting screw. Heretofore, it has been necessary to dismantle the unit in order to replace the contact plug on the armature or movable end. Not only is the dismantling complicated, but often serious damage occurs to the regulator coil assembly and other parts in the process of dismantling and reassembly.

The present invention provides a contact plug that may be installed and removed from the armature assembly by merely removing the pile screw, upper contact plug and carbon pile. Thus, the necessity of dismantling the unit to replace the contact plug on the armature assembly is removed.

An object of the invention is to provide an improved carbon pile regulator.

Another object of the invention is to provide an improved carbon pile regulator in which the contact plugs may be easily replaced.

Another object of the invention is to provide an improved contact plug for a carbon pile regulator.

Another object of the invention is to provide means for replacing the contact plugs of a carbon pile regulator without disassembly of the unit.

Another object of the invention is to provide a method of replacing contact plugs of a carbon pile regulator without dismantling the unit.

The above and other objects and features of the invention will appear more fully hereinafter from a consideration of the following description taken in connection with the accompanying drawing wherein one embodiment of the invention is illustrated by way of example.

Figure 2:
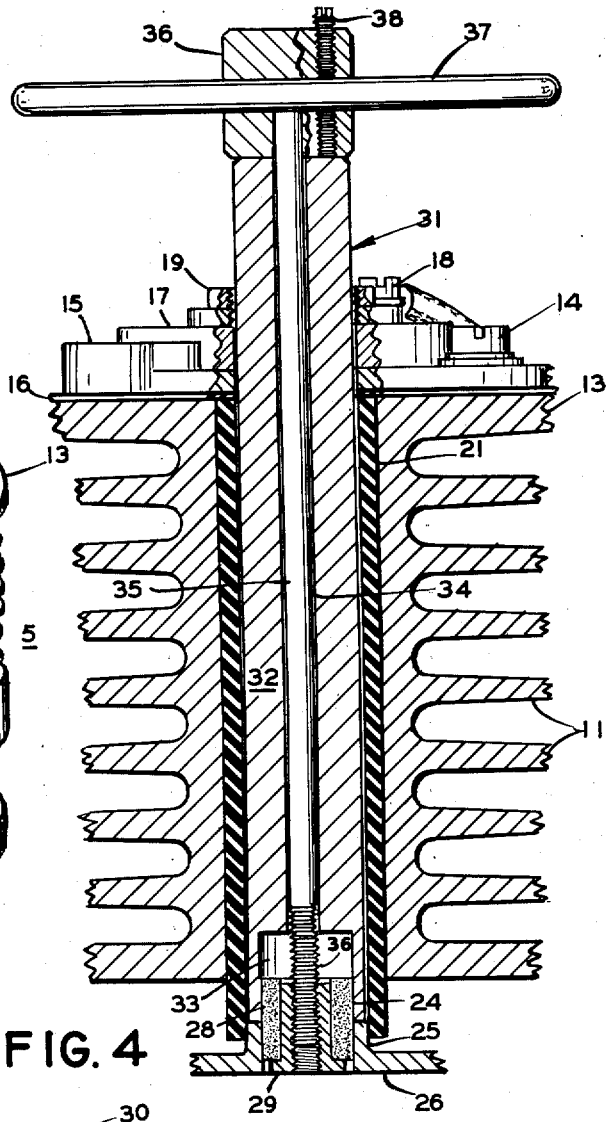
Figure 2 is a cross-sectional view of the regulator of Figure 1 showing the contact plug and tool for removing the plug.
Figure 1:
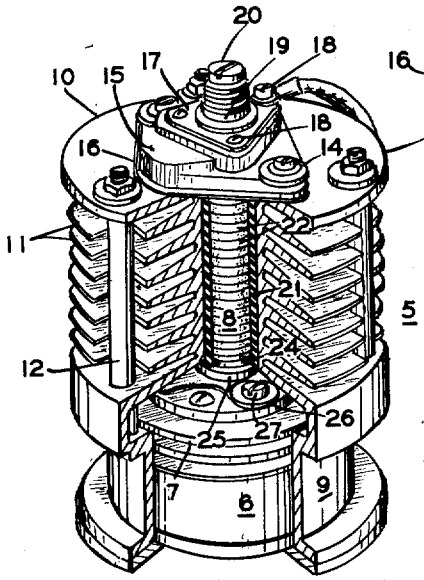
Figure 1 is a cutaway view of a carbon pile regulator illustrating the invention.
Figure 3:
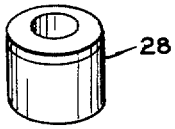
Figure 3 is a perspective view of the contact plug of Figures 1 and 2.
Figure 4:
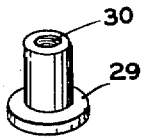
Figure 4 is a perspective view of the insert for the contact plug.

Referring now to the drawing, a carbon pile regulator is indicated generally by the numeral 5 and has an electromagnet coil 6; armature assembly 7 and carbon pile 8. A casing 9 encloses the electromagnet coil 6 and supports the armature assembly 7. The casing 9 is formed of a suitable ferromagnetic material. A carbon pile housing 10 having heat reducing fins 11 is secured to the casing 9 by screws 12. A plate 13 is formed integral with the housing 10 and fastened thereto by screws 14 is a second plate 15.

The plate 15 is insulated from the plate 13 by a suitable insulating member 16. A cap 17 is secured to the plate 15 by screws 18 and has a threaded portion 19 adapted to receive a pile adjusting screw 20.

Mounted in the housing 10 and extending longitudinally therein is a tube 21 of suitable non-conducting material. The tube 21 carries carbon disc 22 forming the carbon pile 8. Contact plugs 23 and 24 are positioned at opposite ends of the carbon pile 8. The contact plug 23, not visible in the drawings, is positioned between the pile 8 and the pile adjusting screw 20 and turning the screw 20 adjusts the initial pressure applied to the pile 8.

The contact plug 24, provided at the opposite end of the pile 8, is mounted in a cup-shaped member 25 formed in an electrical conductor plate 26. The plate 26 is secured to the armature assembly 7 by screws 27. The contact plug 24 comprises a ring-like member 28 of carbon or the like and a metal insert 29. The member 28 may have a coating of silver and is proportioned to have a tight fit with the cup-shaped member 25. The metal insert 29 has a threaded portion 30, the function of which will be explained later.

In order to remove the contact plug 24, without disassembling the unit 5, the screw 20 is removed and the contact plug 23 and carbon pile 8 are withdrawn through the opening in the threaded portion 19 from which the screw 20 was removed. A tool 31 is inserted in the opening with the tube 21 serving as a guide. The tool 31 comprises a cylindrical member 32 having a counterbore portion 33 adapted to fit over the contact plug 24 and an opening 34 extending longitudinally thereof. A rod-like member 35 having a threaded portion 36 on one end thereof is adapted to fit freely in the opening 34. The other end of member 35 terminates in a block 36 and has a cross member 37 extending therefrom. A screw 38 is threaded through the block 36 and is adapted to force the block 36 away from the member 32.

The counterbore portion 33 of the member 32 fits over the contact plug 24 with the edges of the counterbore portion 33 resting on the cup 25. The rod member is threaded into the threaded portion 30 of the insert 29 and the screw 38 turned in a direction to force the block 36 away from the member 32 thereby pulling the plug 24 from the cup 25. The tool 31 is then removed and the plug 24 taken off the member 34.

A new plug 24 may be inserted in the tube 21 and pressed in place by reversing the member 31 and using the flat portion thereof to press the plug 24 into the cup 25. The carbon pile 8 and contact plug 23 may then be inserted and the screw 20 replaced.

While a set screw 38 has been illustrated as means for forcing the block 36 and member 31 apart, it is understood that the means could be a cam, lever or any other conventional means.

Thus, by providing a contact plug having an insert, replacement of the plug is easily achieved by merely removing the carbon pile adjusting screw 25 and the pile. Heretofore, it had been necessary to remove the entire armature assembly. This required that the unit be dismantled in order for the armature assembly to be accessible.

Further, providing the contact plug with an insert does not cut down on the contact area as the carbon discs 22 have a hole through the center.

Although only one embodiment of the invention has been illustrated and described, various changes in the form and relative arrangement of the parts which will now appear to those skilled in the art may be made without departing from the scope of the invention.

What is claimed is:

1. A method of removing a contact button from a carbon pile regulator having a carbon pile, a housing, an electromagnet including an armature assembly, and a carbon pile adjusting screw; said method comprising removing said adjusting screw, removing said carbon pile through the opening formed by the removal of said screw, inserting a tool through said opening to grip said contact button and applying pressure to said tool while holding said armature assembly against said pressure to remove said contact button.

2. A method for removing a contact button from a cup-shaped holder of an armature assembly of a carbon pile regulator having a housing, a carbon pile, and a contact screw, said carbon pile being supported between said contact screw and said contact button; said method comprising the steps of removing said contact screw, removing said pile through the opening caused by the removal of said screw, inserting means through said opening to grip said contact button and press against said cup-shaped holder, and applying pressure to said contact button relative to said cup-shaped holder to remove said button from said holder.

*3. A method of replacing a contact button in a carbon pile regulator having a carbon pile, a housing, an electromagnet including an armature assembly, and a carbon pile adjusting screw; said method comprising removing said adjusting screw, removing said carbon pile through the opening formed by the removal of said screw, inserting a tool through said opening to grip said contact button and applying pressure to said tool while holding said armture assembly against said pressure to remove said contact button, inserting a contact button in said opening, pressing said button into said armature assembly, inserting a carbon pile in said opening, and replacing said adjusting screw.*

*4. A method for replacing a contact button in a cup-shaped holder of an armature assembly of a carbon pile regulator having a housing, a carbon pile, and a contact screw, said carbon pile being supported between said contact screw and said contact button; said method comprising the steps of removing said contact screw, removing the pile through the opening caused by the removal of said screw, inserting means through said opening to grip said contact button and press against said cup-shaped holder, applying pressure to said contact button relative to said cup-shaped holder to remove said button from said holder, inserting a button in said opening, pressing said button into said cup-shaped holder, inserting a carbon pile in said opening, and replacing said screw.*

References Cited in the file of this patent or the original patent

UNITED STATES PATENTS

| Number | Name | Date |
|---|---|---|
| 841,232 | Dana et al. | Jan. 15, 1907 |
| 1,554,688 | Nubson | Sept. 22, 1925 |
| 1,873,250 | Adolph | Aug. 23, 1932 |
| 2,486,978 | Rady et al. | Nov. 1, 1949 |